Feb. 13, 1940. A. KARLSSON-YGGER 2,189,802
RECORDING WEIGHING INSTRUMENT
Original Filed March 15, 1933 5 Sheets-Sheet 1
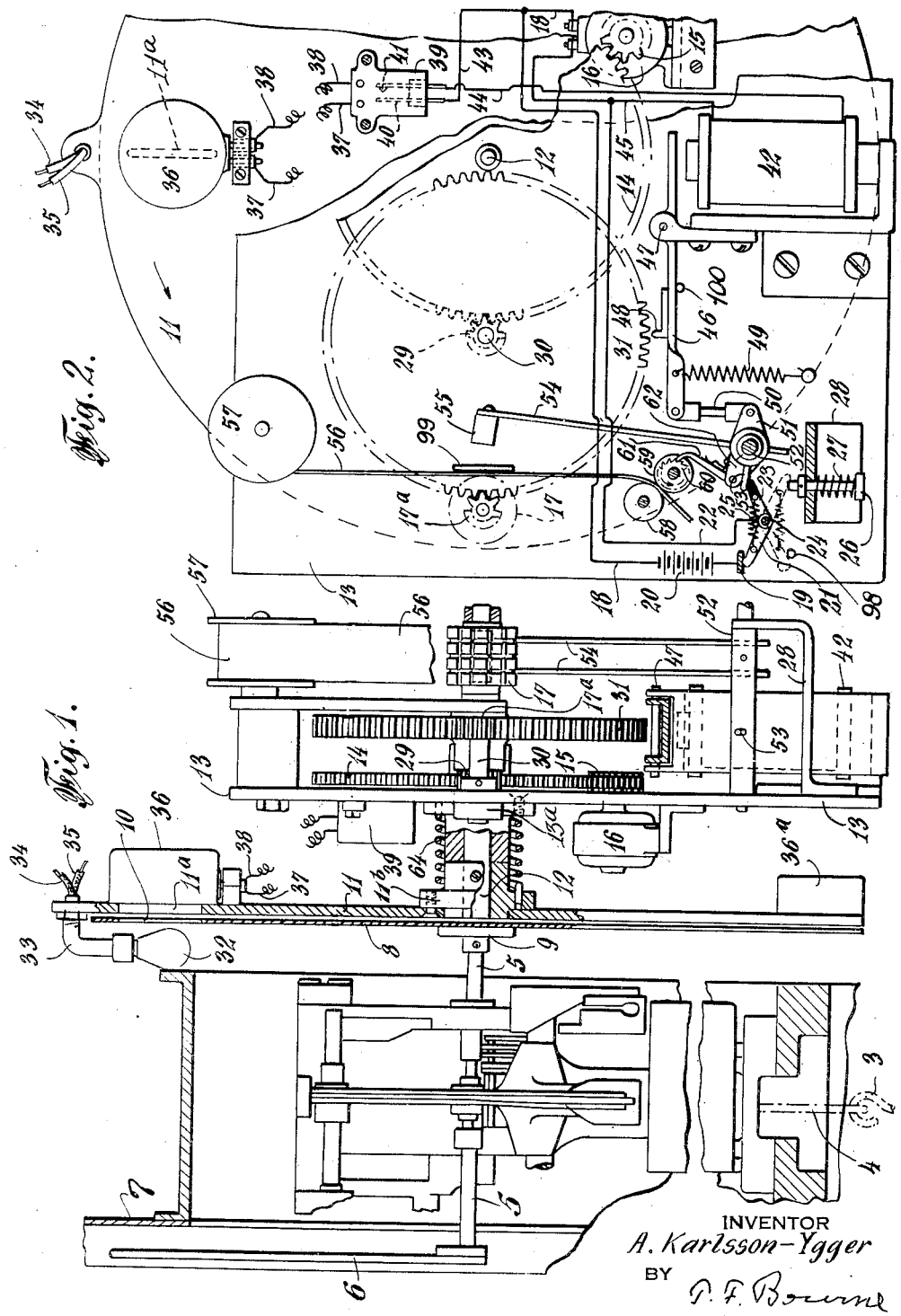
INVENTOR
A. Karlsson-Ygger
BY
P. F. Bourne
ATTORNEY Feb. 13, 1940.  A. KARLSSON-YGGER  2,189,802
RECORDING WEIGHING INSTRUMENT
Original Filed March 15, 1933   5 Sheets-Sheet 2
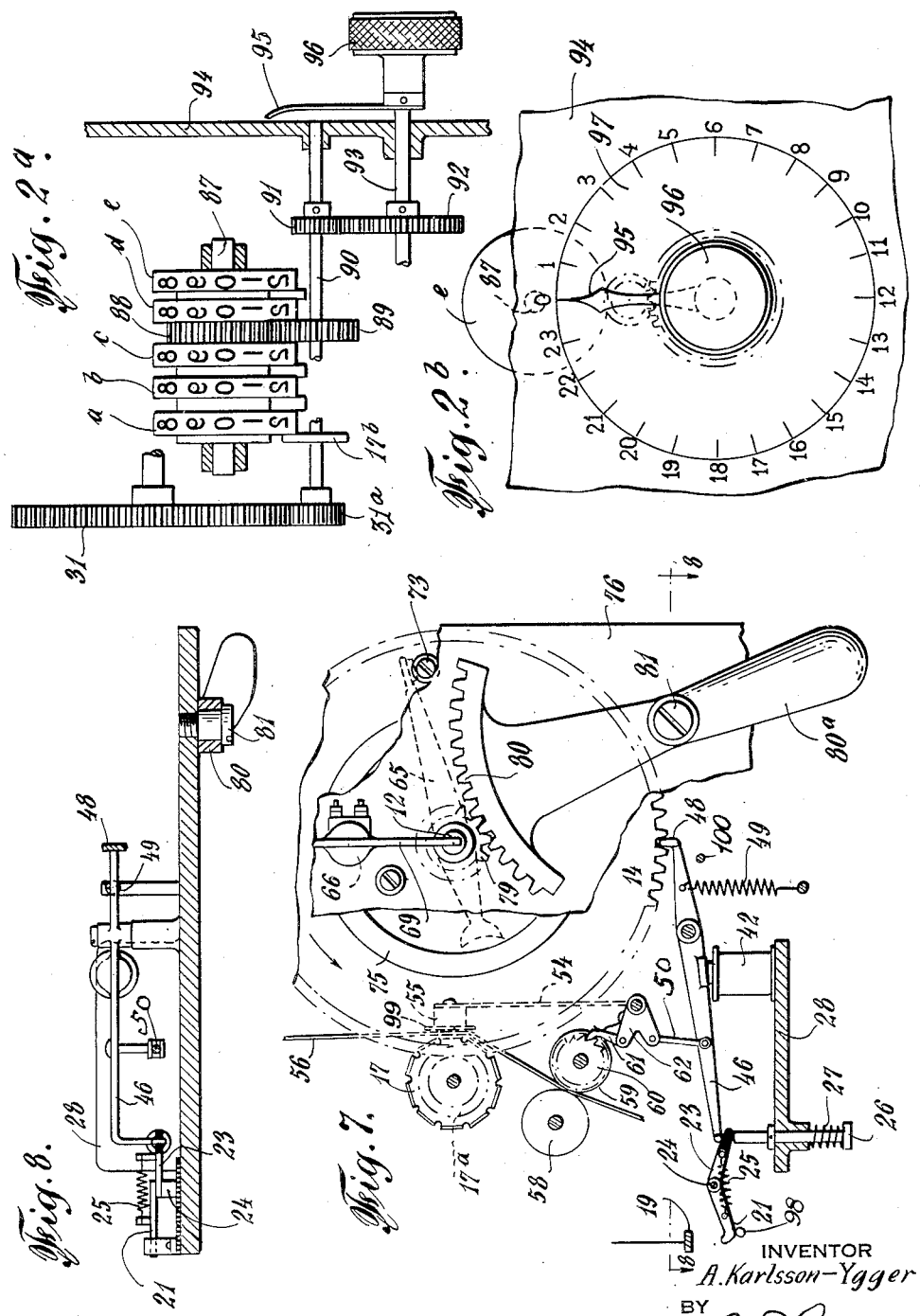
INVENTOR
A. Karlsson-Ygger
BY
T. F. Bourne
ATTORNEY

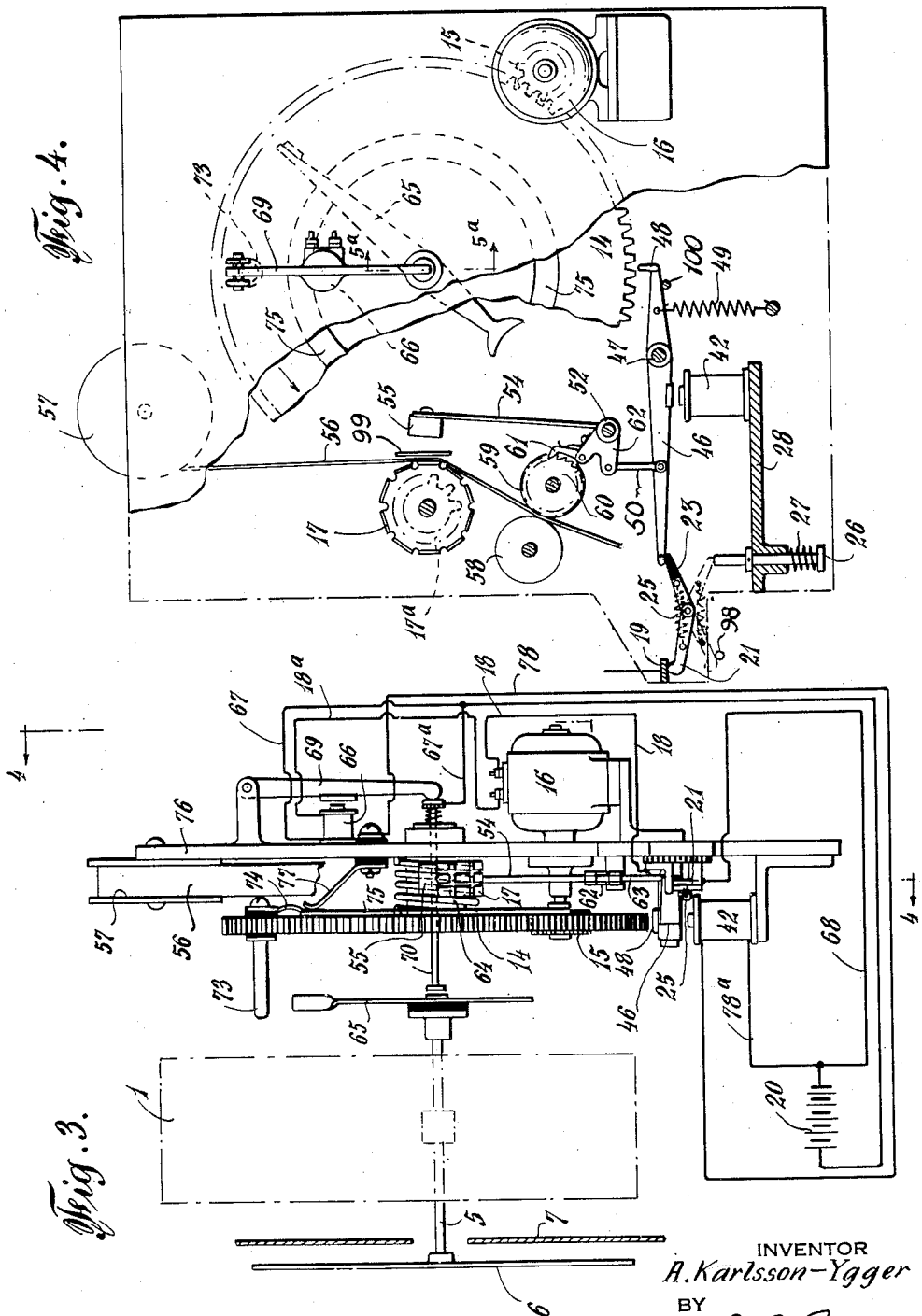

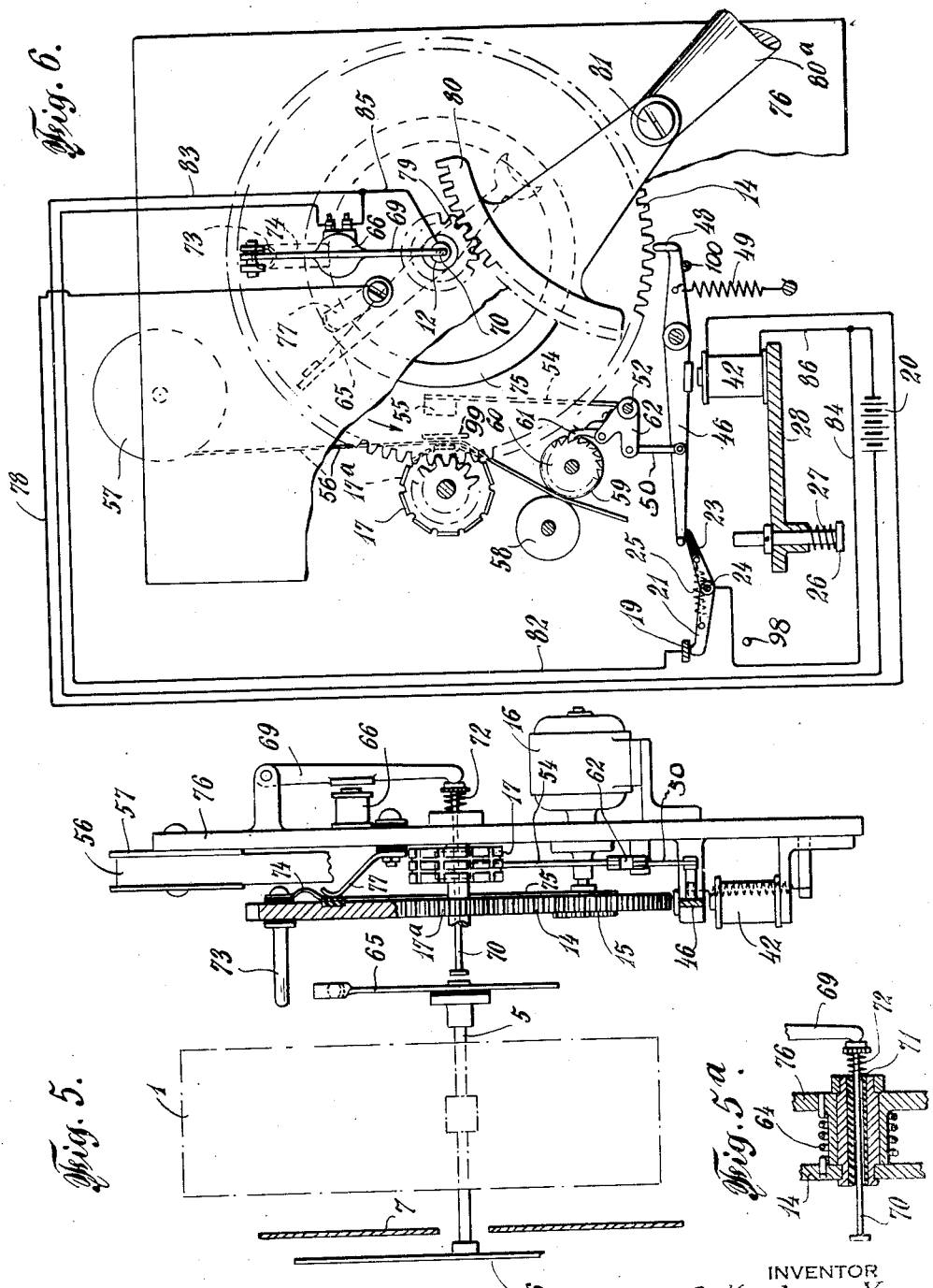

Feb. 13, 1940.                A. KARLSSON-YGGER                2,189,802
                         RECORDING WEIGHING INSTRUMENT
                     Original Filed March 15, 1933    5 Sheets-Sheet 5
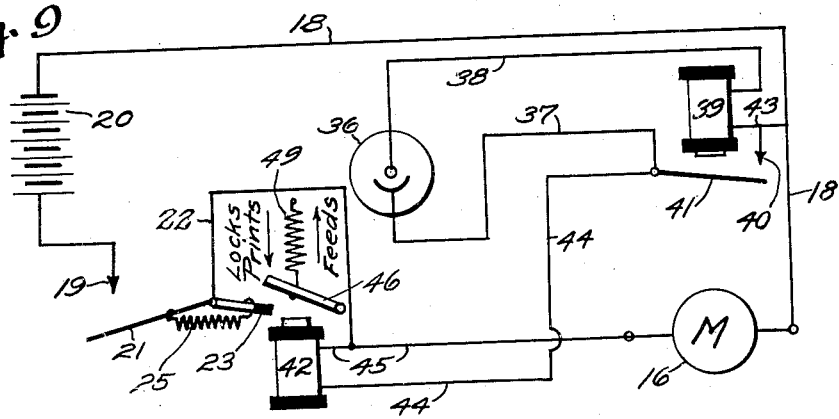
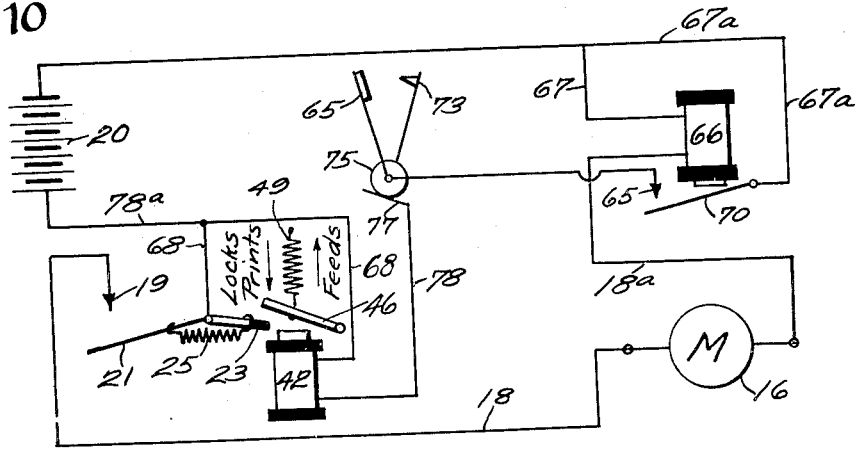
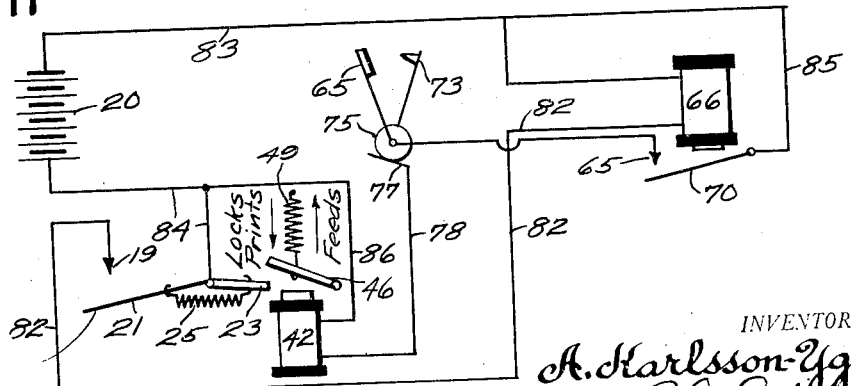
INVENTOR.
A. Karlsson-Ygger
BY
ATTORNEY Patented Feb. 13, 1940

2,189,802

UNITED STATES PATENT OFFICE 2,189,802

RECORDING WEIGHING INSTRUMENT

Albert Karlsson-Ygger, Stockholm, Sweden

Application March 15, 1933, Serial No. 660,866
Renewed October 20, 1938

30 Claims. (Cl. 234—5.4)

In recording weighing mechanisms it is important that the register devices, to be operated by or in connection with the weighing devices, shall not resist the operation of the latter to the detriment of accurate weighing.

One of the objects of my invention is to cause the operation of register devices which are used to record the weight of an article or articles being weighed in accurate accord with such weight, but without in any way resisting the operation of the weighing devices, whereby the accurate weight may be indicated, such as by means of a dial and pointer.

In carrying out my invention I provide a weighing mechanism, weight register devices, such as number wheels, a paper strip, ink carrying ribbon, and a hammer to cause printing of numbers on said strip, and means operative independently of the weighing mechanism for operating the register and recording devices, but controlled for printing on the paper strip by means cooperative with the weighing mechanism when moved to weight indicating position.

My invention also comprises novel details of improvement that will be more fully hereinafter set forth and then pointed out in the claims.

Reference is to be had to the accompanying drawings wherein:

Fig. 1 is a partly sectional edge view of a recording weighing mechanism embodying my invention.

Fig. 2 is a side view of Fig. 1, parts being broken away.

Fig. 2a is a detail view illustrating a weight recording device.

Fig. 2b is a side view of Fig. 2a.

Fig. 3 is an edge view illustrating a modification.

Fig. 4 is a side view of Fig. 3, partly in section and partly broken away substantially on line 4, 4 in Fig. 3.

Fig. 5 is a vertical section of Fig. 3, parts being omitted;

Fig. 5a is a section on line 5a, 5a in Fig. 4;

Fig. 6 is a face view illustrating a modification;

Fig. 7 is a detail view illustrating parts of Fig. 6 in a different position, and Fig. 8 is a section on line 8, 8 in Fig. 7.

Fig. 9 is a diagram of the electrical connections employed in the mechanism of Figs. 1 and 2.

Fig. 10 is a diagram of the electrical connections employed in the mechanism of Figs. 3, 4 and 5, and 5a.

Fig. 11 is a diagram of the electrical connections employed in Figs. 6, 7 and 8.

Similar numerals indicate corresponding parts in the several views.

At 1 is indicated a weighing mechanism which may be of any desired construction, such as the variety provided with one or more weighted arms 2 to be operated from any suitable scale platform or pan which may be connected to the weighing mechanism by means of a hook 3, connecting with a draft tape 4, for operating the arm or arms in any well known way (Fig. 1). The pointer shaft 5, to be operated by the arm or arms 2, is shown provided with a pointer 6 to operate in connection with a dial 7 to indicate the weight of articles being weighed, in a well known way. In Figs. 1 and 2 the pointer shaft 5 is shown provided with a shield or blind which in the form shown comprises a disk 8, of opaque material, secured to said shaft in any desired way, as by means of the hub 9 on said shaft. The disk 8 is provided with an elongated radially disposed slot 10. In coaxial relation to disk 8 a member or disk 11 having hub 11b fixed to shaft 12 is thereby rotatively supported to be free and independent of the disk 8, in such a way that said disks may rotate freely and individually with respect to each other. The shaft 12, in axial alignment with pointer shaft 5, is shown to be journaled in a flanged bearing 13a rigidly projecting from upright 13, carried by the scale framing, and to the right end of shaft 12 in Fig. 1 is fixed a gear 14 for rotating shaft 12 and the member or disk 11. A pinion 15 operative by an electric motor 16 serves to rotate the disk 11. With the rotation of disk 11 the numbering disks of register device 17 will be operated to register the weight of an article being weighed corresponding to the weight indicated by the pointer and dial as is hereinafter described.

The motor may be operated by means of a suitable circuit arranged as follows: One terminal of the motor is connected by conductor 18 to a contact 19, as through a suitable power source 20 (Fig. 2), and a switch member or contact 21 is connected by conductor 22 to the other terminal of the motor. The switch member 21 is operative by an arm 23 preferably made of insulative material, in whole or in part said parts being on a common pivot at 24 and connected together by an over-centering spring 25, tending to draw them toward one another, in the nature of a toggle-switch, so that said parts may assume the position shown by broken lines in Figs. 2 and 4 and by full lines in Fig. 7, with circuit broken, and the position shown by full lines in Figs. 2, 4 and 6 with circuit closed. At 26 is a push button, adapted to be pushed to engage the arm 23 to operate the latter to cause the parts 21 and 23 to quickly operate from the open circuit position to the closed circuit position for closing circuit at contact 19. The parts 21 and 23 have suitable stops to establish them in their full line position in Fig. 2 consisting of the contact 19 and finger 53 respectively, the arrangement being such that spring 25 on one side of pivot 24 will retain the parts 21 and 23 as shown in Fig. 7, arm 23 resting against the end of pushbutton 26 and switch members 21 resting against the insulative stop 98, and when the push button 26 has moved said parts beyond a horizontal, or dead center position, the spring 25 will pull said parts to their full line positions in Figs. 2, 4 and 6. A spring 27, cooperative with push button 26 and with bracket 28 of the scale framing, normally tends to keep the push button retracted downwardly.

The register devices 17 have a pinion 17a for operating them in accordance with the rotation of disk 11. As illustrated in Figs. 1 and 2, a pinion 29 is in mesh with gear 14 and the shaft 30 of said pinion carries a gear 31 in mesh with the pinion 17a. After an article has been weighed and the pointer has come to rest at the front of the dial the push button 26 will be pushed to cause closing of the motor circuit at 19, 21 for partially rotating member 11, and means are provided to automatically stop the rotation of disk 11, as by breaking the motor circuit at 19, 21, when the member 11 has rotated such a distance as will cause the indicating of the weight upon the register devices 17. As illustrated in Figs. 1 and 2, the member 11 is provided with a slot 11a substantially corresponding to the slot 10 of disk 8 and adapted to register therewith in the normal zero position of the parts as shown in Fig. 1, and in other corresponding angular positions of said disk and member. The member 11 carries a light source, such as a suitable electric lamp 32, supported by a tube or the like 33 carried by said member, conductors 34 and 35 leading to the lamp from a suitable power source, the lamp being so spaced from member 11 as to admit disk 8 therebetween to rotate freely. The light source or lamp 32 is in register with slot 11a of member 11, and on the side of said member remote from the light source or lamp 32 is secured a suitable light-sensitive element or device, such as a photoelectric cell 36, that is in register with the slot 11a. At 36a is a counter-weight on member 11. If an element or photoelectric cell 36 such as the "Weston" type be utilized no amplifier will be used, but if a different type cell be used an amplifier will be needed in a known way.

The circuit wires 37, 38, from the photoelectric cell lead to a relay device 39, of any well known construction, to cause closing of its contacts 40, 41, at the appropriate time for causing operation of a magnet 42 after circuit has been closed at 19, 21. Conductor 43, from contact 40, is connected with contact 19, as through conductor 18 and through the battery 20. Contact 11 is connected by conductor 44 with one terminal of the magnet coil at 42, the other terminal of said magnet coil being connected with switch member 21, as by means of conductor 45 connected with conductor 22. The armature 46 of magnet 42 is shown in the form of a lever pivoted at 47, and said armature carries means, such as a detent 48, adapted to engage the teeth of gear to cause member 11 to stop rotating at the appropriate time in weight recording position. A spring 49 connected with armature 46 normally tends to keep the armature retracted from magnet 42 and against the stop 100. Said armature (Fig. 2), is shown pivotally connected by a link 50 with an arm 51 projecting from a shaft 52 journaled on the support 13, which shaft is provided with a projection 53 normally raised when the hammer 54 is retracted from the recording devices 17, and adapted to engage and operate arm 23 when the armature is attracted by magnet 42 to cause switch member 21 to operate to break circuit at 19 and 21, as shown in dotted lines in Fig. 2.

Shaft 52 carries hammer 54 having a head or pad 55 adapted to cause a paper strip 56 to be pressed against the type of the numbering wheels 17 to record the weight of the article being weighed.

In full lines in Fig. 4 and in broken lines in Figs. 6 and 7 there is illustrated the well known expedient of an ink-carrying ribbon 99, carbon strip, or other mark transferring means interposed between the paper strip 56 and the hammer head 55 for causing a record of the type on numbering wheels 17 to be printed upon the paper strip. These numbering wheels alone I may conveniently refer to as weight register devices and they are so termed in certain of the appended claims.

Strip 56 may be carried on a reel 57 suitably supported and adapted to be fed by the feeding rollers 58 and 59. Said roller 59 is shown provided with a ratchet 60 operated by a spring-pressed pawl 61 carried by an arm 62 on shaft 52 which is operated by means of link 50. The arrangement is such that when the magnet 42 releases the armature 46 the pawl 61 will be actuated to operate the feed rollers 58 and 59 to feed the strip 56 a suitable distance for a subsequent printing.

When an article is being weighed and pointer 6 comes to rest to indicate the weight on the dial 7 the disk 8 is correspondingly rotated by the pointer shaft, and the slot 10 of said disk assumes a position corresponding to the pointer, in weight indicating position. At this time the condition is that the magnet 42 is demagnetized, its armature 46 holding detent 48 out of engagement with gear 31, the hammer is retracted, the finger 53 is out of engagement with arm 23, and said arm and switch member 21 are positioned as shown by broken lines in Fig. 2, so that circuits for the motor 16 and the magnet 42 will be broken. When the weight is to be recorded button 26 will be pushed to operate the arm 23 and spring 25 will cause switch member 21 to quickly engage contact 19, closing the circuit of the motor and also establishing current supply as far as each of contacts 40 and 41. The motor will now, through the gearing, cause rotation of the member 11 and simultaneously advancing movement of the register devices 17, and as soon as the member 11 presents its slot 11a, together with the light source 32 and the light sensitive element or photoelectric cell 36, in register with the slot 10 of disk 8 the light will pass through the slots 10 and 11a, and the cell will cause operation of relay 39 to close circuit for magnet 42 by the closing of contacts 40, 41. Thereupon the magnet 42 will attract its armature and cause the detent 48 to engage a tooth of gear 31 to instantly stop rotation of said gear, the motor and the register devices with numerals of the register device in recording or printing position opposite the hammer head corresponding to the weight indicated on the dial. Upon operation of the armature 46 the hammer will be operated to cause printing of the appropriate numerals of the recording device on tape 56, and projection or finger 53 will be moved by the armature to cause operation of arm 23 and switch member 21 to break the circuits at 19, and the motor and the magnet will be deenergized, whereupon armature 46 will be released to withdraw detent 48 from gear 31 and restore the hammer to normal inactive position against the stop 99 in Fig. 2. The hammer will not operate for printing and the switch 21 will not operate to break circuit until detent 48 is nearing the bottom of the space between the teeth. As soon as the circuits are broken and the detent 48 is released from gear 31, a torsion spring 64 connected with member 11 and with the scale framing, such as the part 13, will act to return the member 11 to normal zero position and at such time the gearing will be rotated with said disk causing the register devices to return to zero and the motor to freely rotate reversely. Upon release of the armature 46 the pawl 61 will cause operation of the strip feeding rollers 58, 59 to feed the strip a suitable distance, whereby a ticket bearing the printed weight record may be torn off from the strip. The article being weighed will remain on the scale platform or pan until after the tape has been printed, and when the weight is removed the pointer with the disk 8 will return to the zero position, ready for another weighing operation.

Instead of utilizing a light-sensitive element or photoelectric cell to control the operation of magnet 42, I may provide a contact member operative by and with the pointer shaft 5 to cooperate with a contact carried by a rotative member, corresponding to the member 11, which may be controlled by the motor, in manner before described, or said member may be manually operated. In Figs. 3, 4 and 5 the said devices are motor controlled. The pointer shaft 5 operates a contact member 65 (Fig. 3), which may be secured to and insulated from said shaft, to be rotated therewith free from the register devices, and to assume a position corresponding to the pointer 6 in accordance with the weight of an article being weighed. The gear 14 is operative by the pinion 15 of motor 16, and said gear is shown in mesh with the pinion 17a of the register devices 17, whereby when the gear 14 is rotated a distance corresponding to the location of contact member 65 in weighing position the number disks of the register device will be rotated to present the numbers, corresponding to the weight of the article, in printing position opposing the hammer 54. The conductor 18a of the motor (Fig. 3), connects with one terminal of a relay 66, the other terminal of said relay being connected by conductor 67 with power source 20 from which conductor 68 connects with switch member 21. The armature 69 of relay 66 is adapted to operate an adjustable contact shown in the form of a slidable pin 70, which is shown operative longitudinally in the axis of gear 14 (Fig. 5a), and insulated from said gear by insulation at 71. The adjustable contact or pin 70 is shown lying in the axis of pointer shaft 5 and is adapted to make contact with the contact member 65 on said shaft. A spring 72 normally tends to retract the pin 70 from the contact member 65 and to keep the armature 69 moved away from relay magnet 66. The gear 14 carries a contact pin 73, which projects from said gear in position to engage the contact member 65. The pin 73 is insulated from gear 14 and is shown connected by conductor 74 with a contact ring 75 secured on the face of disk 14 and insulated therefrom, (Fig. 5). The part 76 of the scale frame carries a contact 77 in engagement with the contact ring 75, the contact 77 being insulated from the part 76 and shown connected by conductor 78 with one terminal of magnet 42, the other terminal of magnet 42 being connected by conductor 10 78a to battery 20, and thence the circuit leads through conductor 67 to conductor 67a that connects with pin 70 (Fig. 3), whereby said pin engages contact member 65 the circuit will be from 65 through contact 73 and parts 74, 75 and 77, in all angular positions of member 14.

When a weight is placed upon the scale platform or pan and the pointer stops to indicate the weight the pointer shaft will have moved the contact member 65 correspondingly to weight recording position away from the zero position, at which is also stationed contact 73. Normally the armature 46 will be released from magnet 42, detent 48 will be released from gear 14, the hammer 54 will be retracted, and circuit will be broken at 19, 21, the switch member 21 and arm 23 being in the dotted position of Fig. 4. To cause printing on strip 56 the push button 26 will be pushed to cause member 21 to engage contact 19, in manner before described, whereupon the circuits of motor 16 and of the relay 66 will be closed and relay 66 will attract its armature 69 thereby to push contact pin 70 into engagement with contact member or pilot 65. The motor will then cause the member or gear 14 to rotate, carrying the contact pin 73 with it, until pin 73 meets member 65 whereupon the circuit of magnet 42 will be completed, the member 14 having previously caused operation of the number disks of the register device simultaneously with the progression of pin 73 thereby to bring numbers to printing position corresponding to the weight indicated by the pointer on the dial. When the pin 73 engages the contact member 65 to close the circuit of magnet 42 the latter will be energized to operate its armature 46, whereupon detent 48 will engage a tooth of gear 14 to stop rotation of the latter and of the motor, the hammer 54 will be operated by the armature to cause printing of the appropriate numerals on strip 56, and finally the movement of the armature will operate arm 23 to cause switch member 21 to break circuit at contact 19, whereupon the motor 10, the magnet 42, and the relay 66 will be deenergized. Thereupon the armature 46 will be moved by spring 49 away from the magnet, the hammer will be retracted from the printing position and pawl 61 will cause rollers 58, 59 to advance the printed strip, and the spring 64 will return the member or gear 14, the motor and the pin 73 to the zero position. The armature 69 will permit spring 72 to retract pin 70 from the member 65. When the article is removed from the scale platform the pointer and the contact member 65 will be returned to zero position with respect to pin 73, 65 which was previously returned to zero.

Instead of operating the gear 14 by means of a motor the gear may be operated manually, such as illustrated in Figs. 6 and 7, the parts being otherwise substantially as set forth with respect to Figs. 3, 4 and 5, and with modified circuits, as follows: A pinion 79, secured on the hollow shaft 12 of the gear 14, is in mesh with a segmental rack or gear 80 pivotally supported at 81 on the frame part 76, whereby when said gear is manually rocked, as by means of its handle portion 80a, the gear 14 will be rotated in the appropriate direction. The contact 19 is connected by conductor 82 with one terminal of relay 66, the other terminal of said relay being connected by conductor 83 with a power source 20, and thence through conductor 84 to the contact member 21 so that, when 19 and 21 engage, the circuit of the relay 66 will be closed to cause armature 69 to push the contact pin 70 into contact with contact member 65 of the pointer shaft. From conductor 83 a conductor 85 extends to pin 70, and when contacts 65 and 73 engage the circuit leads thence through 74, 75, 77 and conductor 78 to a terminal of magnet 42, and from the other terminal of said magnet the circuit leads through conductor 86 to the power source 20, and thence returns through conductor 83 to 85 and pin 70.

When the article being weighed causes the pointer 6 to stop at an appropriate position with respect to the dial, and thereby moves the contact member 65 to a corresponding position away from pin 73, the push button 26 will be operated to cause switch member 19 to close the circuit of relay 66, whereby its armature 69 will cause pin 70 to engage the contact member 65. Thereupon the segment 80 will be manually operated to cause the gear 14 to rotate appropriately, whereupon the numbering wheels will simultaneously be advancing to bring the proper numbers in printing position for recording at the moment that gear 14 has caused contact 73 to advance into engagement with contact member 65. The circuit of magnet 42 then will be closed and it will operate the armature 46 to cause its detent 48 to engage and stop rotation of gear 14 and immediately thereupon to cause operation of hammer 54 for printing, followed by operation of arm 23 to cause switch member 21 to break circuit of relay 66 at 19, whereupon pin 70 will be retracted from contact member 65 by spring 72, and the circuit of magnet 42 will be broken to release the armature so that the detent 48 will release gear 14, the hammer will fall back to normal, and the pawl 61 will cause operation of rollers 58 and 59 for feeding the printed strip. Upon release of segment 80 the spring 64 will cause return of gear 14 and the segment to zero position.

In Figs. 2a and 2b I have illustrated a modified form of register devices for printing on the paper strip the weight of the article being weighed, and also number disks for indicating tare cooperatively associated therewith for joint use in recording composite values of weight. The number disks a, b, and c on shaft 87 may be constructed to operate in the ordinary way for such devices, their operation being effected by means of gear 31a and driving gear, such as 31 or 14, and intermittent gear 17b. A gear 88 on shaft 87 is adapted to operate the tare indicating number disks d, e successively in a known manner, and independently of the disks a, b and c, to remain set for printing, after being operated to indicate the tare. The gear 88 is shown in mesh with pinion 89 on shaft 90, the latter having a pinion 91 in mesh with a gear 92 on a shaft 93, the shafts being journaled on support 94. The shaft 93 is shown provided with a pointer 95 and a finger piece 96 to operate in conjunction with a dial 97 having numbers to indicate tare, as in Fig. 2b. Assuming that a tare beam is provided, the poise of the tare beam will be moved to desired capacity to indicate tare, and when the tare is ascertained the pointer 95 will be moved to the corresponding number on the dial 97, whereby the disks d and e will be set for the tare ascertained, to be printed on the tape by the hammer in conjunction with the printing of the weight of the article being weighed, as indicated on the disks a, b and c, as before described.

Figs. 9, 10 and 11, which are electrical diagrams of the connections between the electrically operative units of Figs. 2, 3, and 6, respectively, will make plain the operating analogy of the photo electric cell 36 of Fig. 2 compared with the electrical action of the contacts 65 and 73 of Figs. 3 and 5. From Figs. 9, 10 and 11 also it will be seen that the contact making and breaking plunger 70 of Fig. 5a is, in an electrical sense, the operative equivalent of the armature of a relay, as for instance, the relay 39 of Figs. 2 and 9. It may be noted, however, that the contact plunger 70 also serves as a mechanical brake when thrust against the end of shaft 5.

In Fig. 9 the photoelectric cell or tube represented as a whole by the symbol 36, will be understood to represent a complete light sensitive electrical control unit including all current amplifying means necessary to accomplish operative energization of the solenoid of magnet 39 for operating its armature controlling the contacts 40, 41 of Fig. 2 when the photoelectric tube is subjected to light from lamp 32.

Common to all of Figs. 9, 10 and 11 is the provision of a weight sensitive pilot element, variously shown as applicant's light aperture 10 and mechanical contact 65 and which may take other forms in other constructions of weight indicating and recording mechanisms, freely movable to random weighing positions while unopposed by mechanical resistance of any kind due to electric current feeding parts or mechanical connections. Also in all forms of the present disclosure there is provided a finder variously shown as the applicant's light aperture 11a, movable contact 73, and which may take other forms in different constructions of weight indicating and recording mechanisms. With the above mentioned pilot element and finder is combined an electro-mechanical control system for initiating, performing and terminating a weight recording operation.

The electrical systems of Figs. 9, 10 and 11, are characterized in common by the feature that a toggle arm 23 is manually operated to snap a master switch contact 21 into circuit making engagement with the terminal 19 either to condition the circuit for causing a cycle of automatic recording action or actually to initiate such cycle of action. In all of these figures also, the movement of armature 46 toward its magnet 42 finally results in restoring switch arm 23 and contact 21 to their original circuit breaking position, as a part of the cycle of automatic recording action performed by magnet 42.

In Fig. 9, the closing of circuit at 19—21 starts motor 16 but does not at first energize the relay magnet 39 whereupon relay contacts 40—41 are left open and the recording magnet 42 thereby left de-energized until the running of motor 16 has caused the finder to move a sufficient distance to co-act with the weighing or pilot element in its random position, whereupon the photo electric tube 36 energizes relay magnet 39 to close relay contacts 40, 41, thus energizing recording magnet 42 to perform its cycle of automatic recording action.

In Fig. 10, the closing of circuit at 19—21 simultaneously starts motor 16 and energizes magnet 66 to close circuit at 69—70 whereupon only the movement of finder 73 a sufficient distance, to co-act with the weighing or pilot element 65 in its random weighing position, as caused by running of motor 16 is necessary to complete the circuit through recording magnet 42 whereupon magnet 42 performs its cycle of automatic recording action.

In Fig. 11, the performance is as in Fig. 10 except that motor 16 is omitted and the finder 73 therefore must be manually moved a sufficient distance to co-act with the weighing or pilot element 65 in order to complete the circuit through the recording magnet 42 to cause the latter to perform its cycle of automatic recording action.

In all of Figs. 9, 10 and 11, it will further be noted that electrical means including the electric motor 16, and recording magnet 42, automatically perform and complete the cycle of automatic recording action, including the proper positioning of the weight printing characters consequent merely upon a single manual actuation of the toggle switch 21—23—25 and finally conditioning all of the working parts to perform a subsequent cycle of weight recording action consequent merely upon a repeated and like manual actuation of the toggle switch.

Having now described my invention, what I claim is:

1. In weight recording mechanism, an electro mechanical system for controlling and automatically terminating a cycle of weight recording action including in combination, an element movable to sense a measure of weight, weight registering characters connected to be differentially positioned in accordance with movement of said element, a record receptive blank, an electrically powered prime mover, means operated by the prime mover to print a record of said characters on said blank, an electric switch electrically connected to control the supply of current to the prime mover, and means mechanically operative by said prime mover to cause said switch to cut off the supply of current to the prime mover after a record has been printed on said blank.

2. In combination with a weight recording mechanism as set forth in claim 1, mechanical means reversely to motivate the prime mover after its current supply has been cut off, and connections whereby the prime mover when reversely motivated feeds the record blank preparatory to a subsequent printing thereon.

3. In weight recording mechanism, an electro mechanical system for controlling and automatically terminating a cycle of weight recording action including in combination, an element movable to sense a measure of weight, weight registering characters connected to be differentially positioned in accordance with movement of said element, a record receptive blank, an electro magnet having an armature, means operated by the armature to print a record of said characters upon said blank, an electric switch electrically connected to control the supply of current to the magnet, and means mechanically operative by said armature to cause said switch to cut off the supply of current to the magnet after a record has been printed.

4. In combination with a weight recording mechanism as set forth in claim 3, mechanical means to retract the magnet armature after the supply of current to the magnet has been cut off, and connections whereby the retractive movement of the armature feeds the record blank preparatory to a subsequent printing thereon.

5. In a recording weighing instrument, in combination with a movable weighing element, type devices movable independently thereof, an electric motor connected to move said devices to different positions for registering respectively different values of weight to be recorded, and mechanism electrically operative to stop said motor and to arrest said type devices in weight registering position including a member connected to be operated by said motor and provided with a slot, a light source and a light sensitive electric unit carried by said member in operative relation to said slot, and a disc operative by and with the weighing element and provided with a slot movable with said disc to a position to register with the first said slot thereby to control the operation of said unit and expose the same to light from said source when the type devices are in weight registering position.

6. In combination with a recording weighing instrument as set forth in claim 5, electrically operated printing means including a striker connected to be electrically operated when the said motor is stopped and the said type devices are arrested in their said weight registering position, thereby to print a record from the type devices.

7. In a recording weighing instrument, in combination with a movable weighing element, type devices movable independently thereof, an electric motor connected to move said devices to different positions for registering respectively different values of weight to be recorded, a switch electrically connected to control said motor, and electrically operative mechanism for conditioning said devices for the recording of weight comprising an electromagnet, an electric circuit containing said switch and said electromagnet, means operative by said magnet mechanically to arrest and lock the type devices in weight registering position and later to actuate said switch to effect the release of said devices and means for operatively energizing the circuit of the electromagnet comprising a light sensitive electrical unit, a relay connected to be electrically controllable thereby, a member carrying said unit and connected to be driven by said motor, a light source also carried by said member and arranged to cast a beam of light toward said unit, and a disc connected to move with the weighing element and disposed between the light source and the said unit and having a slot positioned to pass said beam of light when the type devices are at weight registering position.

8. In combination with a recording weighing instrument as set forth in claim 7, printing means including a striker connected to be operated by the said electromagnet to print a record from the said type devices before the latter are released by said electromagnet.

9. In a recording weighing instrument, in combination with a movable weighing element, weight register devices, means to impel said devices to weight registering position preliminary to the recording of weight, an opaque member of continuous annular extent operative with said element and provided with a slot in its said annular extent, a light source and a light sensitive electrical unit mounted for movement in unison along the said annular extent of said opaque member at respectively opposite sides thereof, and electrically operative apparatus having a circuit arranged to be affected by said unit 10. Apparatus for recording random weighing positions of a weight sensitive scale element including in combination with said element, an electric circuit, electrically operated weight recording apparatus arranged to act responsively to current in said circuit, a circuit connected pilot arranged to move in acordance with weighing movement of said element, an electrical brush device adapted to feed said current to said pilot and mechanically retractable therefrom for permitting free movement of said element to its weighing positions, and a circuit connected finder cooperative with said pilot to move to a position relative thereto adapted to complete the circuit, and electrical impelling means to move said finder into circuit completing relation to said pilot, thereby to cause operation of the recording apparatus.

11. Apparatus for recording random weighing positions of a weight sensitive scale element including in combination, a photo-electric tube, an electric circuit electrically associated with said tube to be controlled thereby, electrically operated recording devices connected in said circuit thereby to be governed electrically by said tube, a light shield adapted to govern the access of light to said tube and arranged to move in accordance with weighing movement of said scale element, and electrical impelling means arranged to cause movement of the photo-electric tube relative to said light shield.

12. In electrically operated recording mechanism, positionable devices carrying marking characters, electric motive means to move said devices to different positions for presenting different ones of said characters for recording, an electric switch for stopping the movement of said motive means and devices, printing means to take a record from said characters, and an electromagnet connected to be energized electrically through said switch and acting mechanically when so energized jointly to motivate said printing means and said switch, the switch having a toggle lag action to provide time for the printing means to make the record before said switch operates to break the circuit through said magnet.

13. In a recording weighing instrument, in combination with a movable weighing element, weight register devices movable independently thereof, means to advance said devices in accordance with the weighing position of said element, an electromagnet having a movable armature, a detent mechanically operated by a portion of the armature movement when the electromagnet is energized and thereby operative to arrest and lock the register devices preparatory to recording weight, a switch connected in circuit with said electromagnet and mechanically arranged to be actuated by a following portion of the armature movement thereby to de-energize the electromagnet, a circuit connected pilot arranged to move in accordance with weighing movement of said element, a circuit connected finder movable to follow up and engage the said pilot thereby to energize said electromagnet to cause the armature thereof first to arrest and lock the register devices and later to operate the switch for de-energizing the electromagnet.

14. In combination with a recording weighing instrument as set forth in claim 13, means operated by the said magnet armature and cooperating with the said weight register devices to print a record of weight therefrom while said devices are locked against movement by the said detent, and means operative to retract said detent to release the register devices when the electromagnet is de-energized.

15. In combination with a recording weighing instrument as set forth in claim 13, means operated by the said armature of the electromagnet and cooperating with the said weight register devices to print a record, a strip mounted and disposed to receive said record, and means also operated by the said armature to feed said strip.

16. In combination with a recording weighing instrument as set forth in claim 13, an electrically conductive brush mounted to move into and out of engagement with the said circuit connected pilot, and a second electromagnet connected to be electrically energized through the said switch for moving said brush into engagement with said pilot, together with means to retract said brush from engagement with said pilot when the said second electromagnet is electrically de-energized.

17. In combination with a recording weighing instrument as set forth in claim 13, an electrically conductive brush mounted to move into and out of engagement with the said circuit connected pilot, means acting normally to retract said brush from engagement with said pilot thereby to free the pilot and the said weighing element for sensitive response to weight, and a second electromagnet electrically connected to be energized by said switch for moving said brush into conductive engagement with said pilot in a manner to mechanically brake movement thereof.

18. In a recording weighing instrument, in combination with a weight sensitive pilot element, a movable finder arranged to remain at rest while the pilot element freely advances to weighing position and thereafter advanceable to follow said element to said position and engage therewith, movable weight registering devices carrying type and rotatable about a fixed axis progressively to advance said type in a fixed recording station simultaneously with the movement of said finder to follow up said element, means simultaneously to motivate said finder and said registering devices, a detent operative to arrest said devices and to hold them immovable at their fixed recording station, and means controlled by the engagement of said finder with said element to operate said detent.

19. In a recording weighing instrument in combination with an electric circuit, a weight sensitive circuit governing pilot element, a movable circuit governing finder arranged to remain at rest while the pilot element freely advances to weighing position and thereafter itself advanceable to follow said element to said position and engage therewith, movable weight registering devices carrying type and rotatable for progressively advancing said type about a fixedly stationed axis simultaneously with the movement of said finder to follow up said element, means simultaneously to motivate said finder and said registering devices, a detent operative to arrest said devices and to hold them immovable, electrically operative means connected in said electric circuit thereby to be controlled by the engagement of said finder with said element to operate said detent, and electrically operated printing means controlled by the engagement of said finder with said element and cooperative with the registering devices to print a record from said devices while the latter are held from movement by said detent.

20. In a recording weighing instrument in combination with an electric circuit, a weight sensitive circuit governing pilot element, a cooperative circuit governing finder arranged to operative remain at rest while the pilot element freely advances to weighing position and thereafter itself advanceable to follow said element to said position, movable weight registering devices carrying type and rotatable for progressively advancing said type about a fixedly stationed axis simultaneously with the movement of said finder to follow up said element, an electric motor geared to simultaneously advance said finder and to rotate said registering devices for advancing said type, a detent operative to arrest said devices and to hold the same immovable, an electromagnet operating in said electric circuit and having an armature mechanically connected to operate said detent and an electric switch arranged in the said circuit and adapted to be mechanically actuated by said armature thereby to break said circuit.

21. Apparatus for recording random weighing positions of a weight sensitive light interceptive blind, including in combination with said blind, an electric circuit, a photo electric tube electrically associated with said circuit to govern the same, means to generate light interceptable by said blind and adapted to affect said tube, recording devices connected in said circuit to be governed by said tube, an electrically powered mover connected to operate said retarding devices, connections to insure movement of the photo electric tube and the means to generate light in unison relative to said blind, and an electric motor connected to impel said tube and the said light generative means.

22. Apparatus for exhibiting random weighing positions of a weight sensitive light interceptive blind, including in combination with said blind, an electric circuit, a photo electric tube electrically associated with said circuit to govern the same, means to generate light interceptable by said blind and adapted to affect said tube, weight exhibiting devices connected in said circuit to be governed by said tube, an electrically powered mover connected to operate said retarding devices, connections to insure movement of the photo electric tube and the means to generate light in unison relative to said blind, and an electric motor connected to impel said tube and the said light generative means.

23. In an exhibiting weighing instrument, in combination with a movable weighing element, weight exhibiting devices, means to impel said devices to weight registering position, a member of discontinuous opaqueness operative with said element, a light source and light sensitive electrical unit mounted for movement in unison relative to said member on respectively opposite sides thereof, and electrically operative apparatus having a circuit arranged to be affected by said unit in a manner to cause said apparatus to stop the device impelling movement of said means when the position of said light source and unit relative to said member permits light to pass from the said source to the said unit.

24. In a recording weighing scale, an electro mechanical system adapted both to complete a cycle of manually initiated weight recording action and to automatically resume its original electro mechanical condition, including in combination with a weight sensing electrical controller, devices for making a record of weight, an electro magnet arranged in a circuit and having an armature mechanically connected to motivate said devices, an electrical relay operating to control said circuit and electrically connected to be energized and de-energized by said controller, and means for automatically cutting out said circuit including manually closable contacts arranged to be automatically opened by movement of said magnet armature, thereby to de-energize said electro magnet to permit the system automatically to resume its original electro mechanical condition.

25. Apparatus for recording random weighing positions of a weight sensitive light interceptive blind, including in combination with said blind, an electric circuit, a photo electric tube electrically connected to control said circuit, means to generate light interceptacle by said blind and adapted to produce circuit controlling effects within said tube, weight recording devices, electric power means mechanically connected to motivate said recording devices and electrically connected in said circuit to be governed by said tube, and means mechanically connected to move the photo electric tube relative to said blind.

26. In a weight recording mechanism, an electro mechanical system for controlling a cycle of recording action of said mechanism embodying in combination, movable weight registering characters, an element movable to sense a measure of weight and connected to determine registering positions for said characters, means to print an impression from said characters, an electrically powered prime mover connected to motivate said printing means, a master switch electrically operative to energize and de-energize said prime mover, and connections whereby the prime mover mechanically actuates said master switch thereby to de-energize the prime mover at the end of the recording cycle.

27. In weight recording mechanism, an electro mechanical system for controlling and automatically terminating a cycle of weight recording action, embodying in combination with a frame for the mechanism carrying a recording station fixedly located with respect thereto, an element movable to sense different measures of weight, registering characters connected to be differentially positioned relative to said recording station in accordance with movement of said element, a record receptive blank supported at the recording station, an electrically powered prime mover, means operated by said prime mover to print a record of said characters on said blank, manual means electrically to energize and de-energize the prime mover, and means mechanically operative by said prime mover to cause said switch to cut off the supply of current to the prime mover after a record has been printed on the blank.

28. Apparatus for recording random weighing positions of a weight sensitive light interceptive blind including in combination with said blind, an electric circuit, a photo electric tube operative to effect the opening and closing of said circuit, means to generate a light beam adapted to be directed at said tube to effect electrical changes therein, a finder movable in relation to said blind and arranged cooperatively therewith to determine when said tube shall and shall not be operably subjected to said light beam, recording devices, electrically powered means to motivate said recording devices electrically connected in said circuit to be governed by said tube, and an electrically powered prime mover also connected in said circuit to be governed by said tube and connected mechanically to motivate said finder.

29. Apparatus for exhibiting random weighing positions of a weight sensitive light interceptive blind, including in combination with said blind, an electric circuit, a photo electric tube electrically connected to control said circuit, means to generate light interceptable by said blind and adapted to produce circuit controlling effects within said tube, exhibiting devices, electric power means mechanically connected to motivate said recording devices and electrically connected in said circuit to be governed by said tube, and means mechanically connected to move the photo electric tube relative to the blind.

30. Apparatus for recording random weighing positions of a weight sensitive light interceptive blind including in combination with said blind, an electric circuit, a photo electric tube operative to effect the opening and closing of said circuit, means to generate a light beam adapted to be directed at said tube to effect electric changes therein, a finder movable in relation to said blind and arranged cooperatively therewith to determine when said tube shall and shall not be operably subjected to said light beam, exhibiting devices, electrically powered means to motivate said exhibitng devices electrically connected in said circuit to be governed by said tube, and an electrically powered prime mover also connected in said circuit to be governed by said tube and connected mechanically to motivate said finder.

ALBERT KARLSSON-YGGER.